Patented Sept. 20, 1949

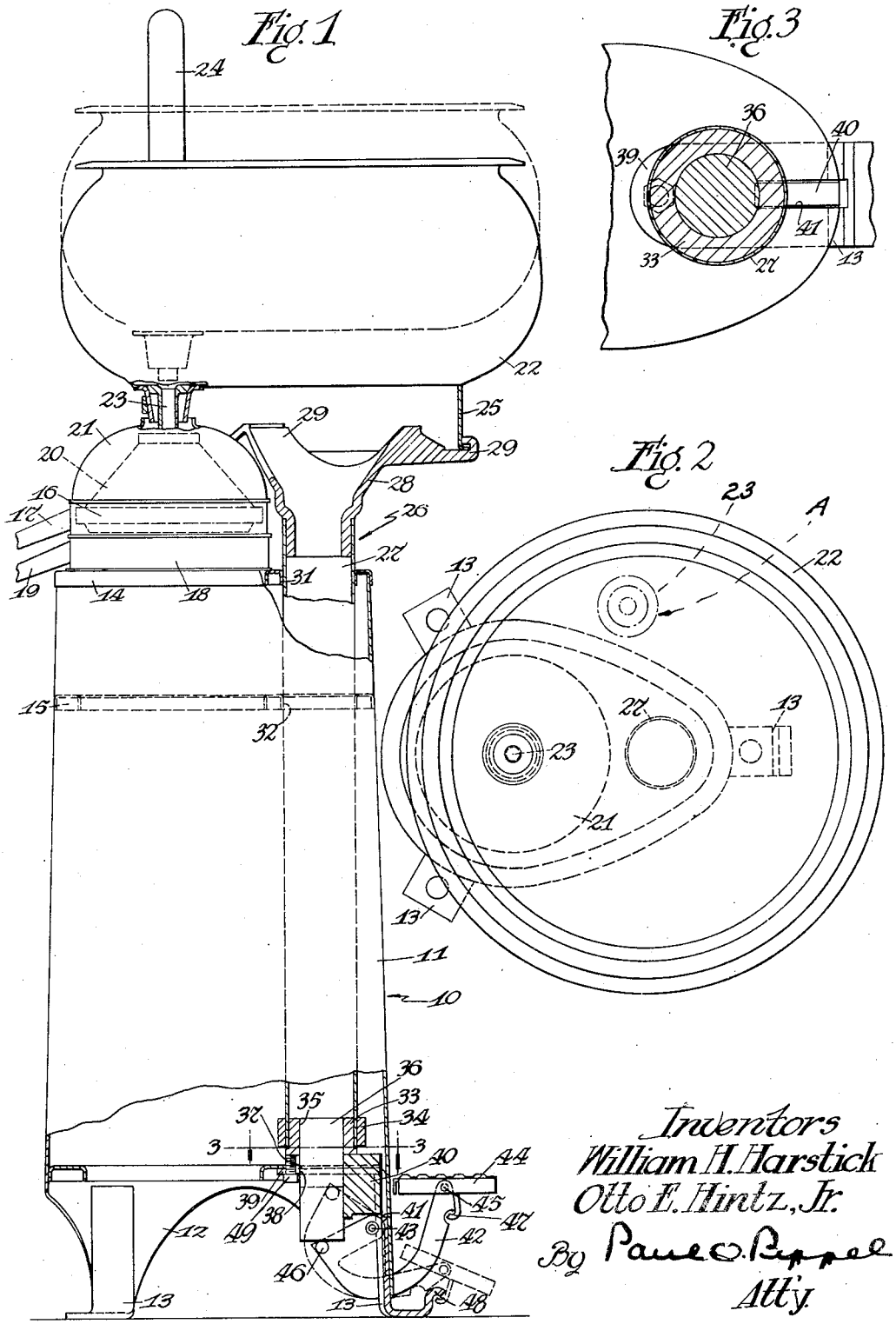

2,482,272

UNITED STATES PATENT OFFICE 2,482,272

CENTRIFUGAL SEPARATOR WITH MOVABLY SUPPORTED SUPPLY CAN THEREFOR

William H. Harstick, Oak Park, and Otto E. Hintz, Jr., Chicago, Ill., assignors to International Harvester Company, a corporation of New Jersey Application June 24, 1946, Serial No. 678,864

6 Claims. (Cl. 233—1)

This invention relates to centrifugal separators and more particularly to cream separators.

More specifically, it relates to the supply can of a centrifugal cream separator. A supply can for cream separators is generally positioned above a cream separating bowl, and fluid to be treated is supplied to the bowl by means of a discharge nozzle projecting from the supply can. It becomes necessary at times to disassemble the cream separating bowl, and in so doing the bowl is generally removed from the remaining structure of the cream separator. Before removing the bowl it is generally necessary to remove the supply can or tank so that ready access may be had to the cover for the separating bowl, the bowl itself and its associated parts. This complete removal of the supply can has many disadvantages, for fluid may be contained within the can thereby making it awkward to handle, and it is generally difficult to find a temporary storage place where the can may be free from possible contamination. Damage to the can due to handling is also a usual and undesirable result.

It is the prime object of this invention therefore to provide an improved supply can for a cream separator, said supply can being readily movable to a non-use position.

Another object is to provide a supply can which can be vertically raised from a use to a non-use position.

A still further object is to provide a supply can which can be readily moved to a non-use position and rotated, thereby permitting ready access to a cream separating bowl and its associated parts.

Another object is to provide a foot operable means for raising a supply can of a type used with a centrifugal cream separator.

Other objects and advantages will become more readily apparent from a reading of the following description and accompanying drawing, in which:

Figure 1 is a side elevational view of a centrifugal cream separator having certain portions thereof broken away to better illustrate the invention;

Figure 2 is a plan view of the same; and

Figure 3 is a sectional view taken along the line 3—3 of Figure 1.

A centrifugal cream separator is generally indicated by the reference character 10. The cream separator 10 includes a housing structure 11, fabricated in this instance from sheet metal, having at its bottom a base portion 12 to which are connected legs 13. Connected to the top portion of the sheet metal housing structure 11 is a closure member 14. A member 15 is positioned below said closure member 14, this member acting as a stiffener and also providing means for supporting an electric motor or driving means, not shown. Supported on the closure member 14 is a stationary tin-ware construction which includes a milk-receiving container 16 having connected thereto a milk discharge spout 17. Positioned beneath the milk-receiving container 16 is a cream-collecting container 18 which has connected thereto a cream discharge spout 19. A separating bowl 20, as shown in dotted lines, is mounted for rotation underneath a bowl cover 21.

Positioned above the cream separating bowl 20 is a supply can 22. The supply can 22 normally contains the liquid to be treated which is discharged from the can through a discharge nozzle 23 into the interior of the separating bowl 20. A valve handle 24 is adapted to regulate the discharge of liquid to be treated from the supply can. Rigidly connected to the underneath portion of the supply can is an annular collar 25 which is seated upon a supply can support generally designated by the numeral 26. The supply can support 26 includes a vertically extending tubular member 27 which is connected at its uppermost portion to a spider 28 having a plurality of supporting arms 29 which rigidly support the supply can 22.

The tubular member 27 extends downwardly through an opening 31 in the closure member 14 and through an opening 32 in the member 15, said closure member 14 and member 15 acting to serve as a guide and bearing means for the tubular member 27. The tubular member is provided at its bottom-most portion with a bearing member 33 rigidly held within the tubular end by means of a collar 34. The bearing member 33 is provided with an opening 35. A thrust member 36 is rigidly held within the opening 35, said thrust member extending through an opening 37 formed in the base portion 12 and through an opening 38 formed in a horizontal section 39 of the leg 13. A lug 40 is rigidly connected to the side of the thrust member 36. This lug 40 cooperates with a slot 41 formed through the base member 12 and the horizontal section 39.

A treadle member 42 is pivotally connected, as indicated at 43, to the base portion 12 and to one of the legs 13. The treadle member 42 includes a pedal element 44 which is pivotally connected thereto as indicated at 45. A bearing pin 46 is connected to a portion of the treadle member 42, said bearing pin acting to engage the thrust member 36. A locking or latching hook 47 is connected to the pedal member 44 and is positioned to rotate with said member. This locking hook is adapted to engage a hook portion 48, as indicated generally in dotted lines in Figure 1. A set-screw 49 is screwed through the horizontal section 39 and through the base portion 12 to engage the lower surface of the bearing member 33. The set screw 49 serves to provide for vertical adjustment of the support 26.

When it is desired for any reason to remove the separating bowl or its associated parts, the operator simply steps on the pedal 44, thereby actuating the treadle to force the thrust member 36 upwardly and thereby raise the supply can support 26 and the supply can 22. The hook portion 47 engages the hook portion 48 to hold the supply can in its elevated non-use position. The supply can and supply can support are thereupon rotated, thereby placing the discharge nozzle in the broken line position indicated by A in Figure 2. During the use position of the supply can support 26, it will be noted that the lug 40 is in sliding engagement with the opening 41 and thus precludes any possibility of the supply can being turned while liquid to be treated is being supplied to the separating bowl. Actuation of the treadle, however, causes this lug 40 to be raised above the base portion 12 so that it is no longer in engagement with the opening 21, thereby permitting rotation of the supply can 26 and the supply can 22 to its non-use position. By raising the can clearance between the bowl and the nozzle 23 is effected. When the can is turned and the nozzle 23 is shifted to the broken line position of Figure 2, the nozzle is no longer in axial alinement with the bowl, thereby providing ample clearance to permit removal of the bowl.

It is thus clearly apparent that the objects of the invention have been fully achieved, and it must be understood that various changes and modifications may be made which do not depart from the spirit of the invention as disclosed nor the scope of the appended claims.

What is claimed is:

1. A centrifugal separator comprising a housing structure having a base portion, a separating bowl mounted for rotation on said housing structure, a supply can positioned above said separating bowl, a discharge nozzle on said supply can, said nozzle being normally in alinement with said separating bowl for supplying liquid to be treated thereto, a support for said supply can, said support including a vertical tubular element connected to said housing for vertical movement, a bearing member connected to the lower end of said tubular element for rotatably supporting said tubular element on said base portion, an opening formed in said base portion, a thrust member connected to said tubular member and projecting through said opening, a treadle member connected to said base portion for engaging said thrust member, said treadle member being operable to raise said tubular element and said supply can, and latching means between said treadle member and said housing structure for latching said supply can in its raised position.

2. A centrifugal separator comprising a housing structure having a base portion, a separating bowl mounted for rotation on said housing structure, a supply can positioned above said separating bowl, a discharge nozzle on said supply can, said nozzle being normally in alinement with said separating bowl for supplying liquid to be treated thereto, a support for said supply can, said support including a vertical tubular element connected to said housing for vertical movement, a bearing member connected to the lower end of said tubular element for rotatably supporting said tubular element on said base portion, an opening formed in said base portion, a thrust member connected to said tubular member and projecting through said opening, and a treadle member connected to said base portion for engaging said thrust member, said treadle member being operable to raise said tubular element and said supply can.

3. A centrifugal separator comprising a housing structure having a ground engaging base portion, a separating bowl rotatably mounted on said housing structure, a supply can positioned above said separating bowl, said supply can including a discharge nozzle normally in axial alignment with said bowl for supplying liquids thereto, a supporting structure for said supply can, said supporting structure including a pedestal member vertically slidable within said housing structure and having an upper portion projecting upwardly above the housing structure, can support means on said upper portion of said pedestal member for supporting said supply can, said pedestal extending downwardly within the housing substantially adjacent to the ground supporting base portion, means for supporting said pedestal member on said housing structure, a thrust member on said pedestal member, and a treadle member pivotally supported on the base portion for engaging said thrust member, said treadle member being arranged and constructed to move said pedestal member vertically thereby raising said supply can.

4. A centrifugal separator comprising a housing structure rotatably supporting a separating bowl, said housing structure including a top closure member having an opening, a liquid supply can positioned above said separating bowl, said supply can including a discharge nozzle in axial alignment with said bowl for supplying liquid thereto, supporting structure for said supply can, said supporting structure including a pedestal member vertically slidable within said housing, said pedestal member having an upper end portion projecting upwardly through the opening, a can support connected to the upper end portion of the pedestal for supporting the supply can, a base portion for supporting the housing structure, said pedestal extending downwardly and being supported on said base portion, a thrust member on said pedestal member, and a treadle member pivotally connected to said housing structure for engaging said thrust member, said treadle member being arranged and constructed to move said pedestal member vertically thereby raising said supply can.

5. A centrifugal separator comprising a housing structure rotatably supporting a separating bowl, said housing structure including a top closure member having an opening, a base portion for supporting the housing structure, a liquid supply can positioned above said separating bowl, said supply can including a discharge nozzle in axial alignment with said bowl for supplying liquid thereto, supporting structure for said supply can, said supporting structure including a pedestal member vertically slidable within said housing, said pedestal member having an upper end portion arranged to slide through the opening in said closure member, a can support connected to the upper end portion of said pedestal member, said pedestal member extending downwardly adjacent the base portion of said housing structure, bearing means between the housing structure and said pedestal member for rotatably supporting said pedestal member for movement about a vertical axis, a thrust member on said pedestal member, and a foot operable member connected to said housing structure, said foot operable member being constructed and arranged to engage said thrust member thereby moving said pedestal member vertically and raising said supply can.

6. A centrifugal separator comprising a housing structure rotatably supporting a separating bowl, said housing structure including a top closure member having an opening, a base portion for supporting the housing structure, a liquid supply can positioned above said separating bowl, said supply can including a discharge nozzle in axial alignment with said bowl for supplying liquid thereto, supporting structure for said supply can, said supporting structure including a pedestal member vertically slidable within said housing, said pedestal member having an upper end portion arranged to slide through the opening in said closure member, a can support connected to the upper end portion of said pedestal member, said pedestal member extending downwardly adjacent the base portion of said housing structure, bearing means between the housing structure and said pedestal member for rotatably supporting said pedestal member for movement about a vertical axis, a thrust member on said pedestal member, a foot operable member connected to said housing structure, said foot operable member being constructed and arranged to engage said thrust member thereby moving said pedestal member vertically and raising said supply can, and means for locking said pedestal member against rotating during the lowered position of the same.

WILLIAM H. HARSTICK.
OTTO E. HINTZ, Jr.

REFERENCES CITED

The following references are of record in the file of this patent:

UNITED STATES PATENTS

| Number | Name | Date |
| --- | --- | --- |
| 579,019 | Smith | Mar. 16, 1897 |
| 636,383 | Hartmann et al. | Nov. 7, 1899 |
| 1,141,282 | Spross | June 1, 1915 |
| 1,202,358 | Braley | Oct. 24, 1916 |
| 1,356,805 | Brownlow | Oct. 26, 1920 |
| 1,430,954 | Deckert et al. | Oct. 3, 1922 |
| 1,662,199 | McCornack | Mar. 13, 1928 |
| 1,729,758 | Bamford | Oct. 1, 1929 |
| 1,987,367 | Lindeberg | Jan. 8, 1935 |
| 2,180,939 | Leef | Nov. 21, 1939 |

FOREIGN PATENTS

| Number | Country | Date |
| --- | --- | --- |
| 743,982 | France | Jan. 16, 1933 |